United States Patent [19]

Okugawa et al.

[11] Patent Number: 5,283,680
[45] Date of Patent: Feb. 1, 1994

[54] OPTICAL CONNECTOR ASSEMBLY

[75] Inventors: Minoru Okugawa; Masakazu Moritoki; Yasuyoshi Suzuki, all of Hiratsuka, Japan

[73] Assignee: Kabushiki Kaisha Komatsu Seisakusho, Japan

[21] Appl. No.: 900,841

[22] Filed: Jun. 18, 1992

Related U.S. Application Data

[62] Division of Ser. No. 499,549, Jun. 27, 1990, Pat. No. 5,163,109.

[51] Int. Cl.$^5$ .............................................. H04B 10/00
[52] U.S. Cl. .................................. 359/171; 359/163
[58] Field of Search ............... 359/109, 142, 143, 144, 359/146, 154, 162, 180, 181, 188

[56] References Cited

U.S. PATENT DOCUMENTS

| | | | |
|---|---|---|---|
| 4,313,226 | 1/1982 | Blackington | 359/147 |
| 4,375,106 | 2/1983 | Voll | 359/181 |
| 4,635,029 | 1/1987 | Yamada | 359/143 |
| 4,769,643 | 9/1988 | Sogame | 359/146 |
| 4,847,507 | 7/1989 | Matson et al. | 359/143 |

FOREIGN PATENT DOCUMENTS 8124340 7/1983 Japan .................. H04B 9/00

*Primary Examiner*—Richard E. Chilcot, Jr.
*Assistant Examiner*—Rafael Bacares
*Attorney, Agent, or Firm*—Welsh & Katz, Ltd.

[57] ABSTRACT

An optical connector assembly (1) for connecting an optical fiber (9), an optical element (4) (light-emitting element or light-receiving element), and an electric circuit together. A bolt (32) of an optical fiber-mounting fitting in which the optical fiber (9) is inserted in the hole of an electric seal (32) and a bolt (31), is screwed into a threaded hole formed in a housing (2) of the plug (1) that accommodates the optical element (4) in order to couple the optical fiber (9) to the plug (1). The connection between the optical element (4) and the electric circuit is accomplished by a jack (20) and the plug (1) is provided with a lock mechanism based on a push-type lever (20), featuring improved sealing performance against water, oil, dust and dirt.

2 Claims, 16 Drawing Sheets

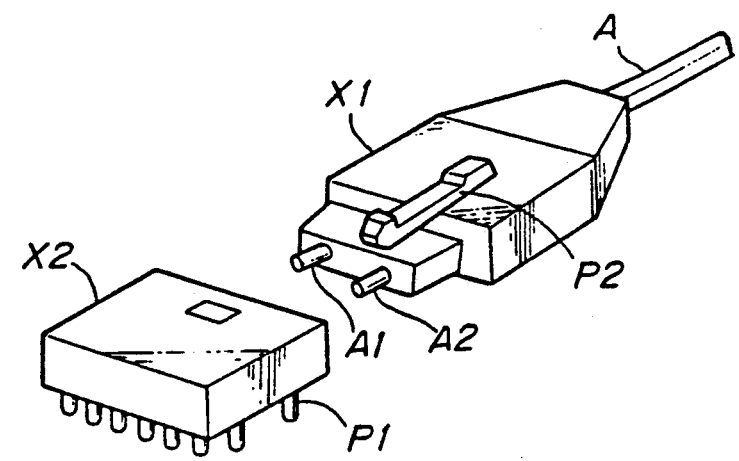
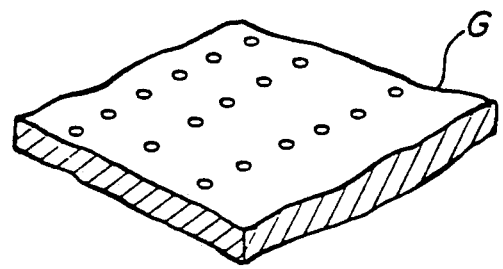
FIG.1
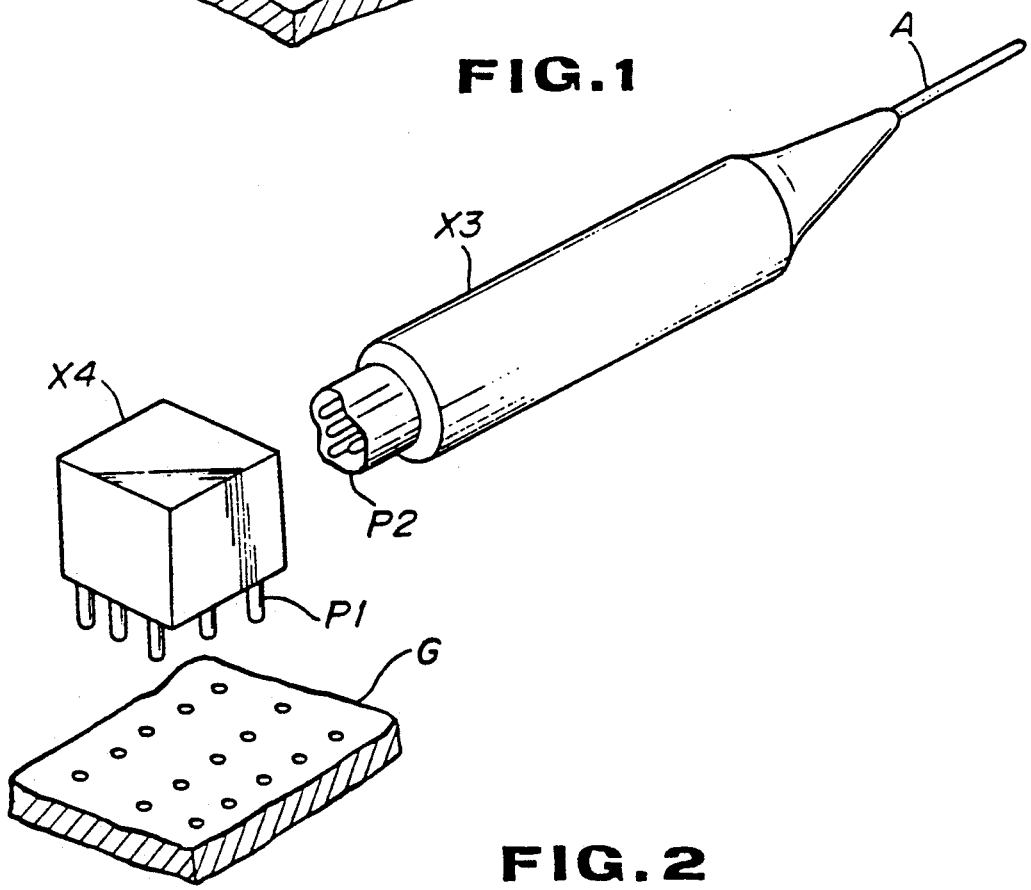
FIG.2

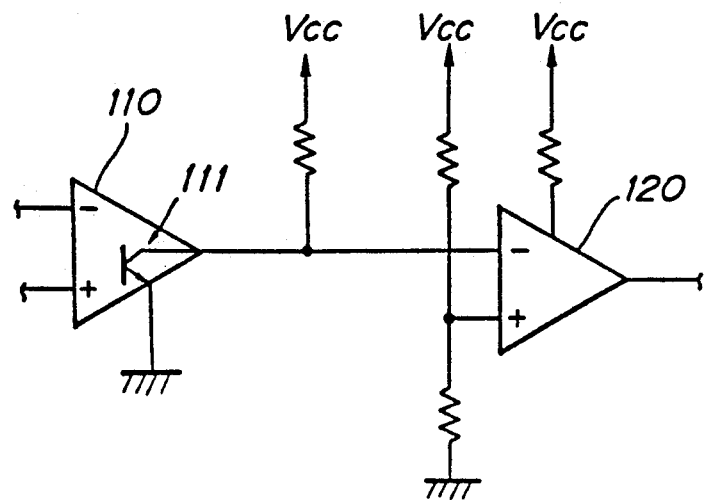
FIG. 8
(a)
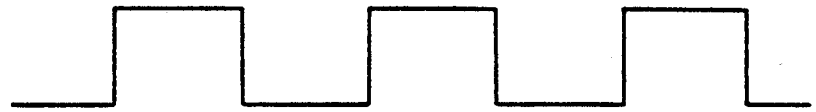
(b)
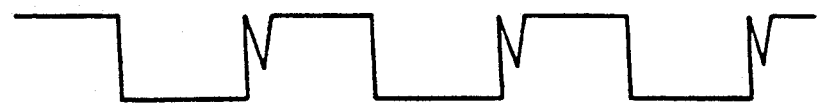
(c)
FIG. 9

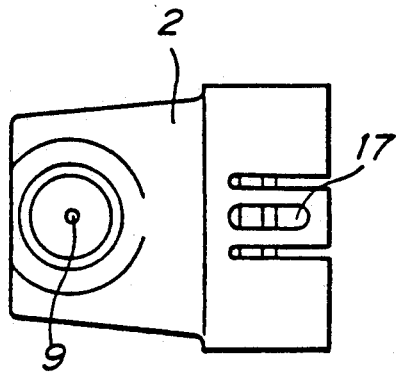
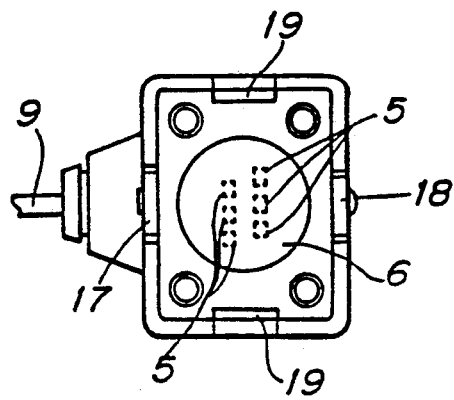
FIG. 13      FIG. 14
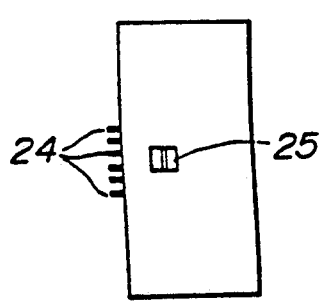
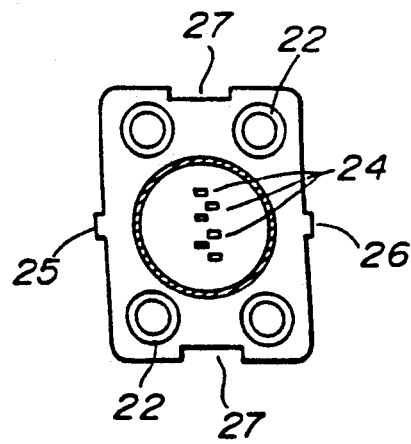
FIG. 15      FIG. 16

OPTICAL CONNECTOR ASSEMBLY

This application is a division of U.S. Ser. No. 499,549, filed Jun. 27, 1990, now U.S. Pat. No. 5,163,109, issued Nov. 10, 1992.

TECHNICAL FIELD

The present invention relates to an optical connector assembly employable for a signal sending apparatus wherein electrical signals are converted into optical signals and the converted optical signals are then sent via an optical fiber or a signal receiving apparatus wherein optical signals received via an optical fiber is converted into electrical signals and the converted electrical signals are then taken out of the signal receiving apparatus.

BACKGROUND ART

An optical connector assembly is an essential device required for constituting an optical communication system, an optical measuring system or the like system wherein various instruments, apparatuses, equipments or optical circuit components are connected to each other via optical fibers. A main function of the optical connector assembly is to connect an optical fiber to an optical element (in the form of a light emitting element or a light receiving element) and moreover connect the optical fiber to an electrical circuit or electrical circuits.

FIGS. 1 and 2 typically show a conventional optical connector assembly by way of a perspective view, respectively.

The optical connector assembly as shown in FIG. 1 comprises an optical connector $X_1$ having end parts $A_1$ and $A_2$ of a two-core type optical fiber A protruded therefrom to firmly hold the optical fiber A and a photoelectric converting module $X_2$ including a photoelectric converting element. With this conventional optical connector assembly, connecting of the optical connector $X_1$ to the photoelectric converting module $X_2$ is carried out by fitting the optical connector $X_1$ to the photoelectric converting module $X_2$ and then actuating a locking mechanism $P_2$. In addition, electrical/mechanical connection of the photoelectric converting module $X_2$ to a printed-circuit board G is carried out by using a lead frame $P_1$ which is arranged below the photoelectric converting module $X_2$.

On the other hand, the conventional optical connector assembly as shown in FIG. 2 includes an integrated type optical module $X_3$ in which a photoelectric converting element is received so that the foremost end of an optical fiber A comes in contact with a light emitting surface or a light receiving surface of the photoelectric converting element. An electric plug $P_2$ is attached to the end surface of the optical module $X_3$ so that the optical module $X_3$ is coupled to an electrical module $X_4$ by fitting the electrical plug $P_2$ into an electrical jack (not shown). Connection of the electrical module $X_4$ to a printed-circuit board G is carried out by using a lead frame $P_1$ in the same manner as described above with reference to FIG. 1.

In this manner, connecting/disconnecting of the conventional optical connector assembly is accomplished by a simple fitting operation for the aforementioned respective components.

Thus, the conventional optical connector assembly can be used without any particular problem for an apparatus or an equipment installed in a calm and dustless environment, e.g., an audio apparatus, an apparatus for hospital, office or the like facilities. However, when the conventional optical connector assembly is used for an apparatus or an equipment operable in a severe environment including vibration, noisy sound, various contaminated material, moisture or dust, e.g., facilities in a factory, an industrial machine or the like, there arise problems that electrical noise is generated due to vibration, noisy sound or the like, a connector falls down naturally, and a running life of a connector and associated components is shortened due to the presence of oily contaminated material, dust or the like foreign material.

In addition, since no seal is employed for connecting/disconnecting locations in components constituting the conventional optical connector assembly, there arises another problem that no optical communication can be made because oil, dust or the like foreign material enters the interior of the optical connector assembly via connecting/disconnecting locations. For the reason, requirements have been raised for developing an optical link which can be used in field under a severe environmental condition due to invasion of water, oil, dust or the like foreign material, even when optical communication is used between controllers for machines (robots, machine tools, presses etc.) installed for factory automation.

Hitherto, the conventional optical connector assembly is commercially sold in a stationary state wherein an optical fiber A is immovably held in a module $X_1$ or $X_3$ as in the case of the optical connector $X_1$ shown in FIG. 1 or the integrated type optical module $X_3$ as shown in FIG. 2. Thus, there arises another problem that it is difficult to adequately adjust a length of the optical fiber A in field by a cutting operation or a connecting operation, because connection or disconnection of the optical fiber A in field is substantially impossible.

When an optical fiber is fitted into an optical connector, hitherto, the optical fiber A is first cut to a predetermined length by actuating a plier, a nipper or the like tool. Thereafter, to make the rugged end surface of the optical fiber A flat correctly, a sheath is removed from the optical fiber by a distance of 1 to 2 mm as measured from the end surface of the optical fiber A and then the end surface of a core $A_a$ of the optical fiber A is brought in contact with a hot plate 101 or an abrasive paper (not shown), as shown in FIG. 3. After heating or grinding the end surface of the core $A_a$, a rubber seal is fitted round the core $A_a$ at a suitable position away from the end surface of the core $A_a$.

However, if the optical fiber A is excessively heated or ground, there is a danger that the sheath may be deformed, as shown in FIG. 4, resulting in the optical fiber A being undesirably damaged or injured. In such a case as described above, it becomes impossible to insert the optical fiber into a hole on the optical connector. Even though the optical fiber could be inserted into the hole, an optical coupling efficiency of the optical fiber and other optical factors may be degraded.

In a case where the conventional optical connector assembly is used as an optical signal sending module for optical communication, light generated by a light emitting diode (hereinafter referred to as a LED) is transmitted via an optical fiber but the light is dampened more and more as a length of the optical fiber, i.e., a distance of transmission of optical signals is elongated.

To assure that a constant quantity of light is always received regardless of how far a distance of signal transmission is elongated, a circuit structure as shown in FIG. 5 has been heretofore employed.

Referring to FIG. 5, an optical signal sending module 102 includes a LED 103 and a switching transistor 104 as essential component for the purpose of optical communication. In response to inputting of signal data SIG via a terminal $T_2$, the transistor 104 is turned on or off and thereby the LED 103 is turned on or off. The module 102 is connected to a power supply source circuit 105 via a terminal $T_1$. The circuit 105 includes a direct current power supply source 106 and a plurality of fixed resistors $R_1$, $R_2$, --- $R_n$ connected to the power supply source 106 in parallel therewith. One of a plurality of terminals $S_1$, $S_2$, --- $S_n$ on the circuit 105 side is connected to the terminal $T_1$ on the optical module 102 side so that an intensity of light generated by the LED 103 is correctly adjusted by feeding an adequate intensity of electric current to the LED 103 corresponding to the present distance of signal transmission.

A structure wherein a variable resistor 107 is connected to the LED 103 in the optical module 102 in series as shown in FIG. 6 is known as other example of the foregoing kind of prior art. Additionally, arrangement of an adjustable resistor 108 outside of the optical module 102 as shown in FIG. 7 is known as another example of the prior art. With the conventional structure as shown in FIGS. 6 and 7, however, it is necessary that a suitable resistor on the circuit 105 side is selected from among the plural resistors for the optical module 102 and the thus selected resistor is connected to the optical module 102 at a position outside of the optical module 102. Particularly, with the conventional structure as shown in FIG. 6, it is necessary that the variable resistor 108 is adjusted correctly. For the reason, there arises a problem that handling of the optical fiber in field and a setting operation for a length of the optical fiber in field become complicated.

In a case where the aforementioned conventional optical connector assembly is used as a signal receiving module for optical communication, in response to receiving of an optical signal, an output from the optical connector assembly is delivered to a printed-circuit board electrically connected to the optical connector assembly, whereby the signal in the form of an output from the optical connector assembly is processed in a signal processing circuit mounted on the printed-circuit board. However, it is essential, from viewpoint of a necessity for demodulating the optical signal thereby to check the content of data included in the optical signal, that an optical signal receiving circuit for converting the optical signal into an electrical signal thereby to discriminate the content of a logical level of the electrical signal is arranged in each signal receiving section in the optical communication system.

In fact, the applicant of the present invention invented an optical signal receiving circuit employable for an optical communication system wherein the content of a logical level of an input signal can be discriminated without any adverse effect of the input signal on an offset voltage and moreover a duty ratio of the discriminated output signal can be maintained normally and he filed an application for patent later (refer to Japanese Patent Application NO. 175694/1987).

This prior invention discloses a comparator circuit as shown in FIG. 8 which is constructed in a two-stage structure comprising a first comparator 110 and a second comparator 120 situated at the later stage. The conventional comparator circuit is constructed such that the content of a logical level of a received signal (input signal) is discriminated independently of an offset voltage of the received signal by making comparison in the first comparator 110 as to a level of the received signal and incorrect variation of a duty ratio of the discriminated signal is automatically corrected by making comparison in the second comparator 120 as to a level of the discriminated signal to reverse a manner of inputting a signal corresponding to the input signal and a voltage (signal) corresponding to the threshold voltage relative to the first comparator 110.

With the above construction, the comparator circuit can accomplish the initially intended object without fail. As shown in FIG. 8, however, the first comparator 110 and the second comparator 120 are activated with a constant magnitude of voltage $V_{cc}$ derived from the power supply source.

Specifically, when a transistor 111 in the first comparator 110 at the first stage fails to be activated because a voltage appearing at a collector of the transistor 11 is held at a level of $V_{cc}$, i.e., when an output derived from the comparison made in the first comparator 110 is held at a logical "1" level, a value of voltage indicative of the output derived from the comparison is raised up near to the voltage $V_{cc}$ appearing at the collector of the transistor 11.

On the other hand, the second comparator 120 is likewise activated with the voltage $V_{cc}$ derived from the power supply source.

In this case, an input voltage required for normally operating the second comparator 120 is set to a voltage value substantially equal to about 80% of the voltage $V_{cc}$ of the power supply source depending on characteristics of the second comparator 120.

Therefore, when an output (a signal remaining at a logical "1" level) derived from the comparison in the first comparator 110 the output being boosted near to the voltage $V_{cc}$ of the power supply source, is inputted into an input terminal of the second comparator 120, there arises a problem that the second comparator 120 may incorrectly be operated, resulting in an exact output failing to be obtained.

FIG. 9(c) shows a time chart which illustrates a desirable output wave form of the comparator 120. Once the second comparator 120 is incorrectly operated, phase deviation occurs, as shown in FIG. 9(a). Otherwise, a signal may be deformed at the time of signal rising, as shown in FIG. 9(b).

DISCLOSURE OF THE INVENTION

The present invention has been made with the foregoing problems in mind.

An object of the present invention is to provide an optical connector assembly which can be used for apparatuses and equipments operable in a severe environment including vibration, noisy sound, various contaminated material, moisture or dust.

Other object of the present invention is to provide a jig for treating the foremost end surface of an optical fiber wherein the jig can prevent a sheath of the optical fiber from being deformed due to heat or friction when the foremost end surface of the optical fiber is heated or ground.

Another object of the present invention is to provide an apparatus for sending optical signals wherein an adequate intensity of power derived from light generated by a light emitting diode can easily and quickly be transmitted in field by a distance of transmission differing in dependence on a length of the optical fiber without any particular necessity for adjusting variable resistors or arranging resistors outside of the apparatus.

Further another object of the present invention is to provide a comparator circuit including comparators in two-stage structure wherein the circuit can reliably prevent a comparator situated at a later stage from being operated incorrectly.

To accomplish the above objects, there is provided according to one aspect of the present invention an optical connector assembly comprising an optical fiber fitting unit including an elastic seal and a bolt, the elastic seal being formed with a hole at the central part thereof and the bolt being likewise formed with a hole at the central part thereof so that an optical fiber extends through the hole of the elastic seal and the hole of the bolt; a jack including a plurality of contacts, a housing of the jack being formed with a plurality of elastic levers in the form of push levers; and a plug including a light emitting element or a light receiving element and a plurality of contacts electrically connected to the light emitting element or the light receiving element and adapted to come in contact with the plural contacts of the jack, a housing of the plug being formed with a threaded hole opposite to a light emitting surface of the light emitting element or a light receiving surface of the light receiving element as well as a plurality of apertures of which contour is designed to coincide with a contour of each of the elastic levers so as to allow each elastic lever to be detachably fitted into the corresponding aperture; whereby the optical fiber is coupled to the plug by threadably fitting a plurality of male threads on the bolt of the optical fiber fitting unit into the threaded hole of the plug.

With such construction, the optical fiber fitting unit is connected to the plug via threadable fitting. An elastic seal is interposed between the plug and the jack, and plug is coupled to the jack with the aid of a locking mechanism comprising a plurality of apertures and a plurality of elastic levers in the form of push levers each adapted to be fitted into the corresponding aperture. Thus, an industrial apparatus or equipment can be operated even in a severe environment including vibration, noisy sound, various contaminated material or dust without an occurrence of malfunctions that electrical noise is generated, a connector falls down naturally and a running life of components constituting the connector is shortened. Since the optical fiber fitting unit is threadably connected to the plug, a length of the optical fiber can be adjusted easily. In addition, positional displacement, maintenance service or repairing operation for various apparatuses each utilizing optical communication can be carried out at a high efficiency.

Further, according to the present invention, an O-ring is interposed between the plug and the jack and moreover a packing is interposed between the jack and the wall surface of a casing to which the jack is attached. Consequently, sealability of the optical connector assembly against oil, dust or the like foreign material can be improved further.

According to other aspect of the present invention, there is provided an optical connector assembly comprising an optical fiber fitting unit including an elastic seal and a cover of which sectional shape is designed in an E-shaped contour, the elastic seal being formed with a hole at the central part thereof and the cover being formed with a hole at the central part as well as a plurality of female threads on the inner wall thereof so that an optical fiber extends through the hole of the elastic seal and the hole of the cover; an optical module including a cylindrical housing which is formed with a through hole extending along a center axis of the housing, a light emitting element or a light receiving element being received in the hole such that a light emitting surface of the light emitting element or a light receiving surface of the light receiving element intersects the center axis of the cylindrical housing at a right angle, a plurality of male threads being formed round the outer periphery at one end part of the cylindrical housing and a plurality of female threads being formed round the inner periphery at the other end part of the cylindrical housing; and an electrical module including a plurality of contacts which are connected to the light emitting element or the light receiving element via a plurality of electrical wirings, the electrical module being formed with a plurality of male threads round the outer periphery of a cylindrical housing thereof, the male threads being threadably engaged with the female threads round the inner wall of the cylindrical housing for the optical module; whereby, the optical fiber is coupled to the optical module by threadably fitting the female threads of the cover for the optical fiber fitting unit onto the male threads of the cylindrical housing for the optical module, while the elastic seal is tightly encased in the hole of the optical module.

With such construction, since the optical module, the optical fiber fitting unit, the optical module and the electrical module are connected to each other via threadable fitting, sealability of the optical connector assembly against water, oil, dust or the like foreign material can be improved further and the optical connector assembly can normally be used even in an undesirable environment.

Alternatively, the elastic seal in the optical fiber fitting unit may be eliminated. In this case, at least a projection in the cover extending along a center axis of the optical connector assembly is made of elastic material.

According to another aspect of the present invention, there is provided a jig for treating the foremost end surface of an optical fiber comprising an optical fiber fitting unit including an elastic seal and a bolt, the elastic seal being formed with a hole at the central part thereof and the bolt being formed with a hole at the central part thereof so that an optical fiber extends through the hole of the elastic seal and the hole of the bolt, a first jig of which one end part is machined in the form of a threaded hole adapted to threadably receive the bolt and of which other end part is machined in the form of a guide hole which is communicated with the threaded hole, the guide hole being dimensioned to have an inner diameter substantially equal to an outer diameter of the optical fiber; and a second jig having a hole formed at the central part thereof, the hole being dimensioned to have an inner diameter substantially equal to an outer diameter of the optical fiber; whereby the bolt of the optical fiber fitting unit is threadably fitted into the threaded hole of the first jig, while the first jig is held in close contact with the second jig, and thereafter the second jig is disconnected from the first jig so as to allow the foremost end surface of the optical fiber to be treated.

With such construction, a distance between the foremost end surface of the optical fiber extending through the guide hole and the end surface of the first jig is kept constant. Since a sheath of the optical fiber is firmly retained in the guide hole, an occurrence of deformation due to heat or friction caused by a grinding operation for a core of the optical fiber can be prevented reliably.

According to another aspect of the present invention, there is provided an apparatus for sending optical signals wherein a switching circuit is turned on or off depending on data to be sent and a light emitting diode for optical communication electrically connected to the switching circuit is turned on or off in response to ON or OFF of the switching circuit so that light generated by the light emitting diode which has been turned on or off is sent as a signal for optical communication via an optical fiber, the apparatus comprising a plurality of fixed resistors electrically connected to the light emitting diode for optical communication in parallel therewith, and a plurality of terminals electrically connected to one ends of the fixed resistors so that a predetermined magnitude of voltage is applied to the terminals from a power supply source, wherein the light emitting diode for optical communication, the switching circuit and the fixed resistors are integrated in a single module.

With such construction, since the optical signal sending apparatus includes a plurality of fixed resistors for previously adjusting an intensity of power of emitted light in dependence on a distance of the optical fiber in a light emitting diode driving circuit based on a power of light generated by the light emitting diode and a dampening value related to the distance of the optical fiber and further includes a plurality of terminals connected to the fixed resistors in series so as to allow a voltage of the power supply source to be applied to the terminals, the apparatus can easily and quickly be adjusted corresponding to a distance of transmission of optical signals merely by connecting the power supply source to the corresponding connector pins, even in a case where a length of the optical fiber is to be adjusted in field.

According to another aspect of the present invention, there is provided an apparatus for sending optical signals wherein a switching circuit is turned on or off depending on data to be sent and a light emitting diode for optical communication electrically connected to the switching circuit is turned on or off in response to ON or OFF of the switching circuit so that light generated by the light emitting diode which has been turned on or off is sent as a signal for optical communication via an optical fiber, the apparatus comprising a plurality of fixed resistors electrically connected to the light emitting diode for optical communication in series, and a plurality of terminals electrically connected to each other in series so that a predetermined magnitude of voltage is applied to the terminals from a power supply source, wherein the light emitting diode for optical communication, the switching circuit and the fixed resistors are integrated in a single module.

According to this embodiment of the present invention, since the plural fixed resistors included in the apparatus are electrically connected to the light emitting diode in series, there is no danger that an electric current of which intensity exceeds the maximum rated value is fed to the light emitting diode even in a case where two or more terminals are incorrectly connected to the power supply source. Consequently, the apparatus can reliably prevent the light emitting diode from being undesirably damaged or injured.

According to another aspect to the present invention, there is provided a comparator circuit including a first comparator at a first stage and a second comparator at the second stage, wherein a voltage derived from dividing of the voltage of the power supply source is applied to an output terminal of the first comparator and a voltage to be inputted into an input terminal of the second comparator is restricted to assume a voltage value within a predetermined range set for allowing the second comparator to be normally operated.

According to further another aspect of the present invention, there is provided a comparator circuit including a first comparator at a first stage and a second comparator at a second stage, wherein a voltage of the power supply source to be applied to the second comparator is boosted so that an input voltage outputted from the first comparator raises up the upper limit voltage value for the second comparator within a predetermined range for allowing the second comparator to be normally operated.

With such construction, since it is assured that the comparator at the later stage in the comparator circuit constructed in a two-stage structure is normally operated at all times, an exact output wave form can be obtained reliably. Consequently, when the comparator circuit as constructed in a two-stage structure in that way is employed for an optical signal receiving circuit or the like circuit for optical communication, reliability of data derived from demodulating of optical signals can be improved substantially.

BRIEF DESCRIPTION OF THE DRAWINGS

FIG. 13 is a plan view illustrating the plug in FIG. 11

FIG. 14 is a side view illustrating the plug in FIG. 11,

FIG. 15 is a plan view illustrating a jack for the optical connector assembly in accordance with the embodiment of the present invention in FIG. 10, FIG. 16 is a side view of the jack in FIG. 15

BEST MODE FOR CARRYING OUT THE INVENTION

Now, the present invention will be described in detail hereinafter with reference to the accompanying drawings which illustrate preferred embodiments thereof.

Figure 3:
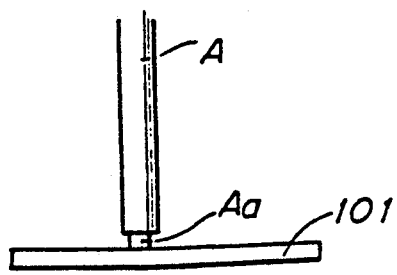
Figure 4:
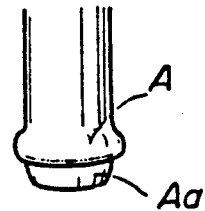
Figure 5:
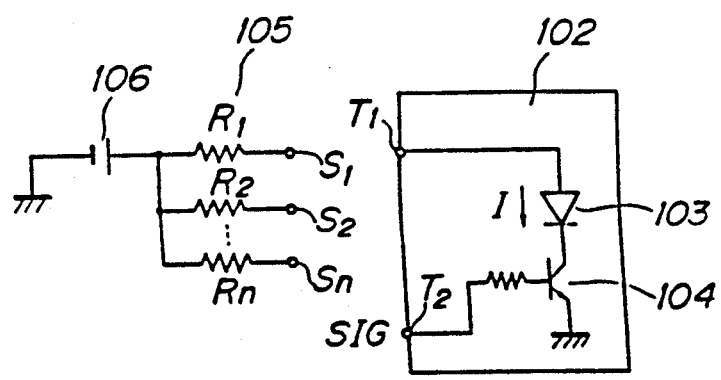
Figure 6:
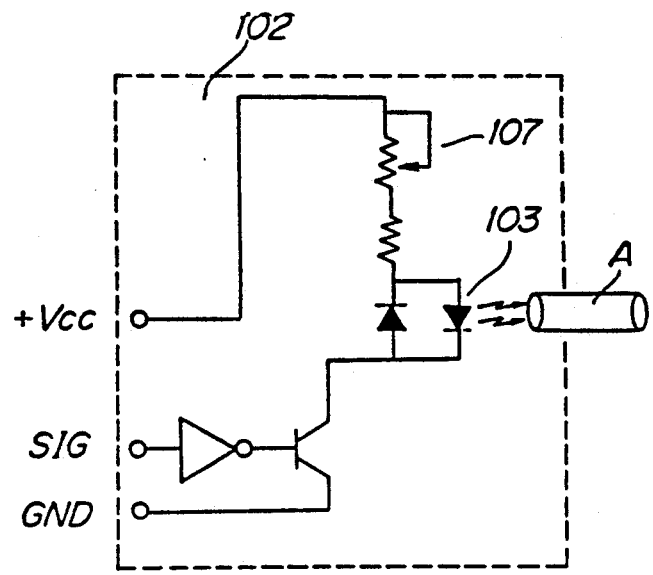
Figure 7:
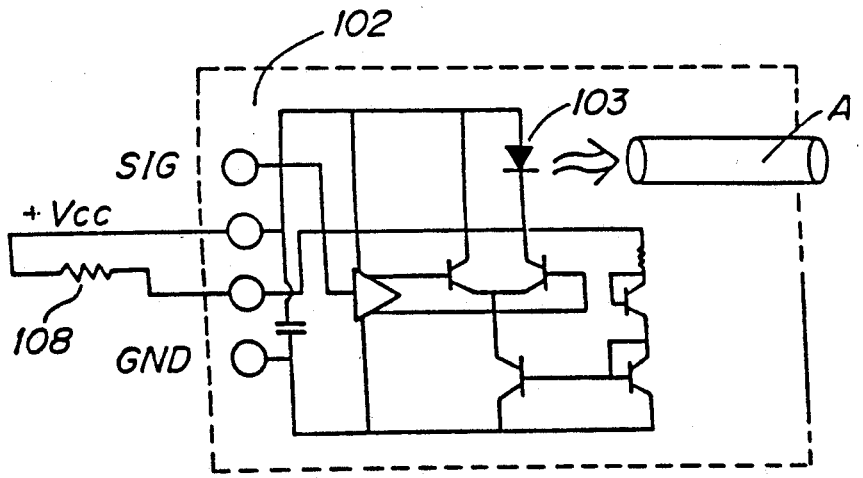
Figure 10:
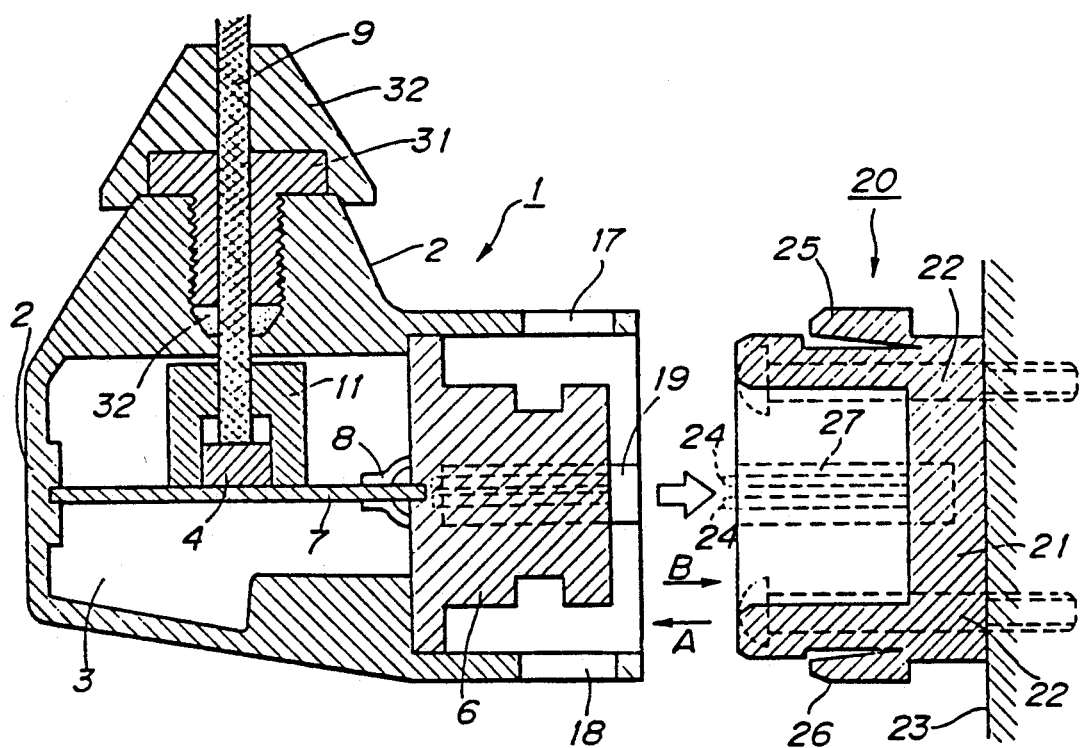
FIG. 10 is a sectional view of an optical connector assembly in accordance with an embodiment of the present invention.
Figure 11:
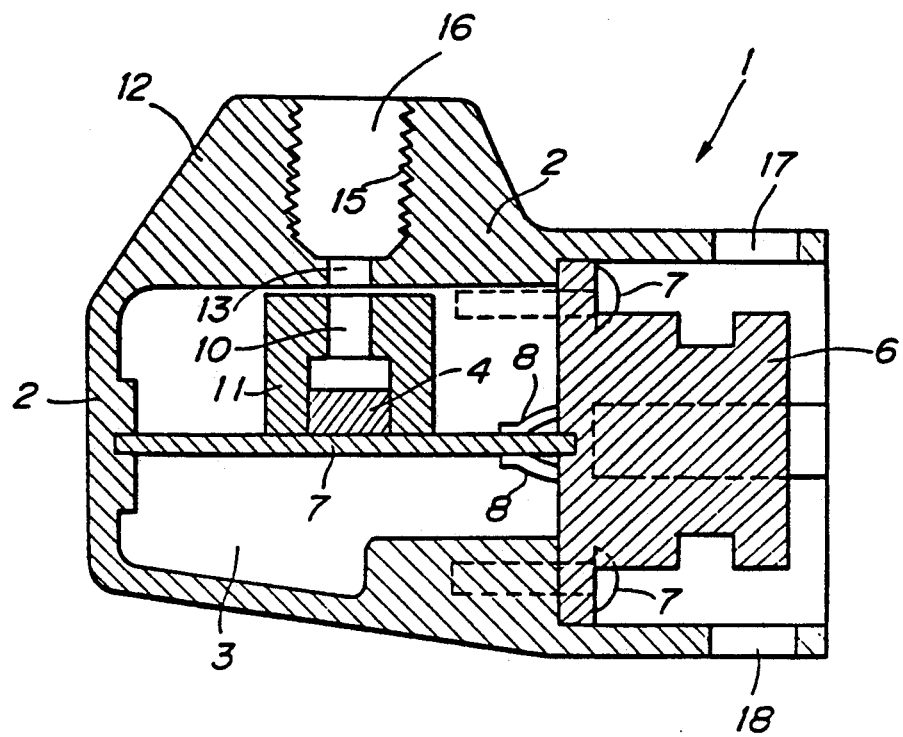
FIG. 11 is a sectional view illustrating a plug for the optical connector assembly in accordance with the embodiment of the present invention shown in FIG. 10.
Figure 12:
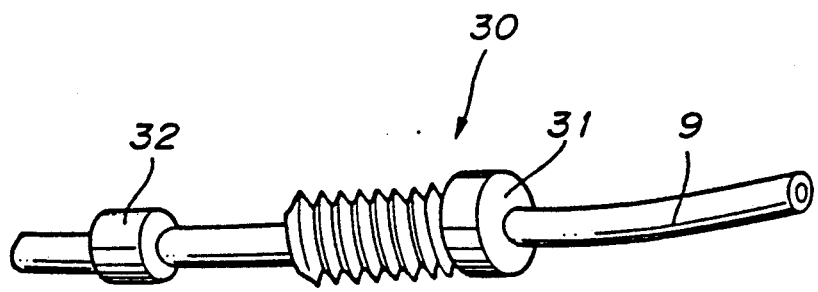
FIG. 12 is a perspective view illustrating an optical fiber fitting unit for the optical connector assembly in accordance with the embodiment of the present invention shown in FIG. 10.

FIGS. 10 to 16 show an optical connector assembly in accordance with a first embodiment of the present invention, respectively. FIG. 10 is a sectional view which illustrates the whole structure of the optical connector assembly of the present invention, FIG. 11 is a sectional view which illustrates structure of a plug 1 side (i.e., female connector side) before an optical fiber 9 is fitted to the plug 1, FIG. 12 is a perspective view which illustrates an optical fiber 30 side before the optical fiber 9 is fitted to the plug 1, FIG. 13 is a plan view of the plug 1, FIG. 14 is a side view of the plug 1 as seen in an arrow A-marked direction (see FIG. 10), FIG. 15 is a plan view of a jack 20, and FIG. 16 is a side view of the jack 20 as seen in an arrow B-marked direction (see FIG. 10). Basically, the optical connector assembly includes a plug 1 and an optical fiber fitting unit 30 (see FIG. 12) as essential components. The optical connector assembly of the present invention is constituted by connecting these components to each other in such a manner as described later.

Referring to FIG. 11, a hollow space 3 is formed at the central part of a housing 2 for the plug 1 and a light emitting element or a light receiving element 4 is received in the hollow space 3. When the optical connector assembly of the present invention is used as a signal sending module, the light emitting element 4 is received in the hollow space 3. To the contrary, when the optical connector assembly is used as a signal receiving module, the light receiving element 4 is likewise received in the hollow space 3. The light emitting element and the light receiving element are hereinafter generally referred as an optical element.

Specifically, a contact member 6 having six female contacts 5 formed thereon (see FIG. 14) is fastened to the housing 2 of the plug 1 by a plurality of bolts 14 (or by using an adhesive), and a card edge wiring board 7 is firmly supported by the side wall of the contact member 6 in cooperation with the side wall of the housing 2. Electrical connection of the card edge wiring board 7 to the contact member 6 is accomplished by card edge connectors 8 which are bridged between the side wall of the contact member 6 and the card edge wiring board 7. The optical element 4 is mounted on the card edge wiring board 7 so that light coming from an optical fiber 9 is converted into an electrical signal by the optical element 4 or light derived from conversion from an electrical signal into an optical signal is transmitted to the optical fiber 9. The optical element 4 is surrounded by an adaptor 11 which is formed with a guide hole 10 through which the optical fiber 9 is inserted. An inner diameter of the guide hole 10 is dimensioned to coincide with an outer diameter of the optical fiber 9. It should be noted that the guide hole 10 is located opposite to a light emitting surface or a light receiving surface of the optical element 4.

The housing 2 of the plug 1 has a projection 12 which is located above the hollow space 3, and the projection 12 is also formed with a guide hole 13 in alignment with the guide hole 10 in the adaptor 11. In addition, a threaded hole 16 including a number of female threads 15 is formed in a region above the guide hole 13 in alignment with the latter.

As shown in FIG. 12, the optical fiber fitting unit 30 comprises a bolt 31 and an elastic seal 32. A hole for allowing the optical fiber 9 to extend therethrough is formed in the bolt 31 along a center line of the optical fiber fitting unit 30. Similarly, a hole for allowing the optical fiber 9 to extend therethrough is likewise formed in the elastic seal 32 along the center line of the optical fiber fitting unit 30. Therefore, the optical fiber 9 extends through the hole in the bolt 31 and the hole in the elastic seal 32.

As is apparent from FIG. 10, when the bolt 31 is threadably engaged with the threaded hole 16, the foremost end of the optical fiber 9 is brought in close contact with the light emitting/receiving surface of the optical element 4, while the elastic seal 32 is tightly encased in a space below the threaded hole 16. In the case as shown in FIG. 10, sealability is enhanced by tightly placing a seal cap 33 on the bolt 31.

Apertures 17 and 18 are formed on the housing 2 of the plug 1 at two locations on the jack 2 side and rectangular projections 19 are projected on the inner wall of the housing 2 at two locations on the jack 20 side.

On the other hand, a housing 21 of the jack 20 is fastened to the side wall 23 of a box-shaped casing for a wiring panel or the like components by tightening four bolts 22, and six male contacts 24 are projected in the interior of a hollow space in the housing 21. Thus, electrical connection is established between the plug 1 and the jack 20 by fitting the male contacts 24 into the corresponding six female contacts 5 on the plug 1 side. The male contacts 24 are electrically connected to a wiring pattern on a wiring panel 22 via a plurality of electrical wirings (not shown), whereby the male contacts 24 are electrically connected to a signal receiving circuit or a signal sending circuit via the wiring pattern.

Push levers 25 and 26 adapted to be fitted into the apertures 17 and 18 on the plug 1 side are provided at upper and lower parts of the housing 21 and rectangular recesses 27 adapted to receive the projections 19 on the housing 2 of the plug 1 are formed on the inner wall of the housing 21 of the jack 20.

Thus, the projections 19 on the plug 1 and the recesses 27 in the jack 20 serve as a guiding member, respectively, when the jack 20 is fitted into the plug 1 to constitute the optical connector assembly of the present invention. In addition, the apertures 17 and the push levers 25 serve as a locking member, respectively.

In this manner, with the optical connector assembly as shown in FIGS. 10 to 16, the optical fiber fitting unit 30 is threadably connected to the plug 1, while the elastic seal 32 is tightly encased in the joint portion therebetween. Thus, the optical connector assembly of the present invention can satisfactorily be used in a severe environment under undesirable conditions of vibration, noisy sound, moisture and dust with improved sealability.

Figure 17:
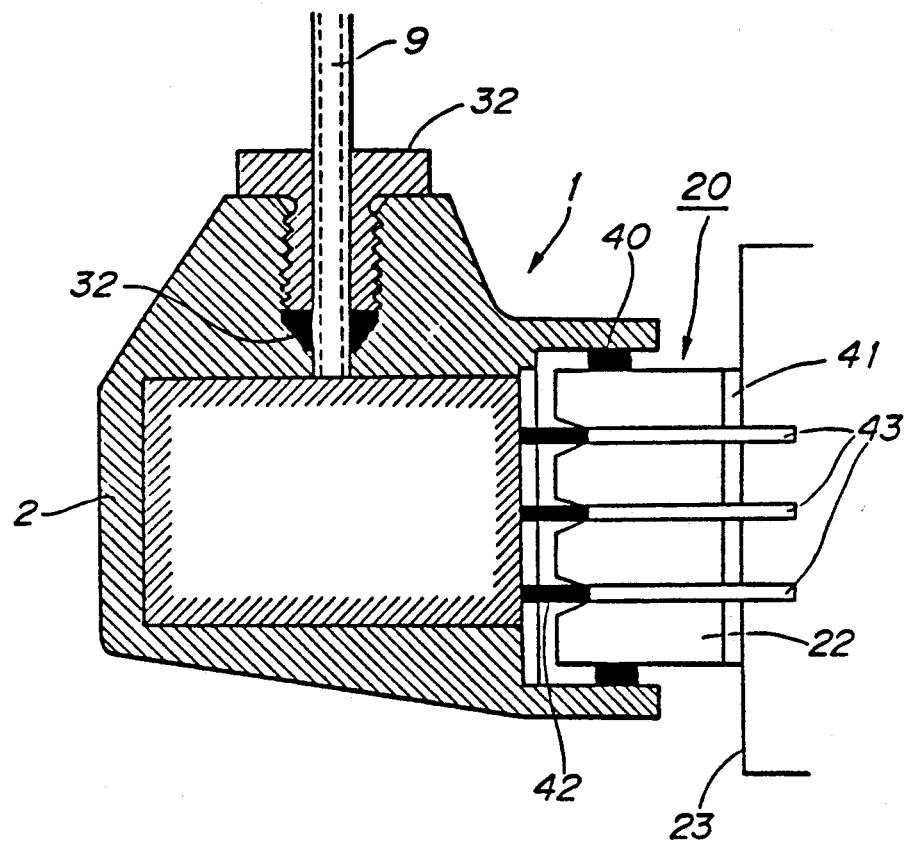
FIG. 17 is a sectional view of an optical connector assembly in accordance with other embodiment of the present invention.

FIG. 17 is a sectional view which illustrates an optical connector assembly in accordance with a second embodiment of the present invention. To improve sealability between the plug 1 and the jack 20 as well as between the jack 20 and the side wall 23 of a box-shaped casing, an O-ring 40 is interposed between the plug 1 and the jack 20 in an assembled state. Additionally, a packing 41 is interposed between the jack 20 and the side wall 23 of the box-shaped casing. In this case, a plurality of male contacts 42 are arranged on the plug 1 side, while a plurality of female contacts 43 are arranged on the jack 20 side. To this end, a plurality of holes are formed on the packing 41 so as to allow the female contacts 43 to extend through the packing 41.

Figure 18:
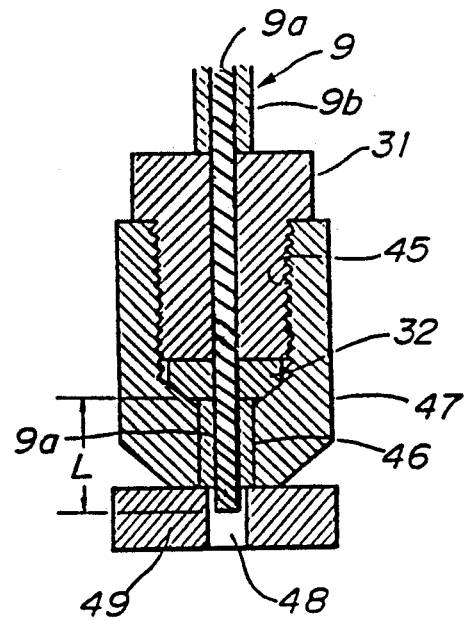
FIG. 18 is a sectional view illustrating by way of example a jig for treating the foremost end surface of an optical fiber.
Figure 19:
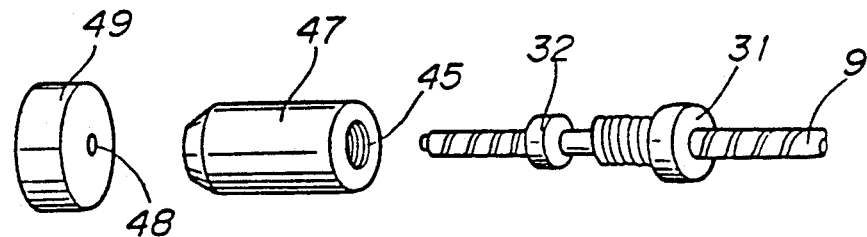
FIG. 19 is a perspective view illustrating the jig in FIG. 18 in a disassembled state.

To carry out the first and second embodiments of the present invention, the foremost end surface of the optical fiber 9 is treated by using a jig as shown in FIGS. 18 and 19, before the optical fiber 9 is coupled to the plug 1.

As shown in FIGS. 18 and 19, the jig for treating the foremost end face of the optical fiber 9 comprises a first jig 47 and a second jig 49. The first jig 47 is formed with a threaded hole 45 at the upper end part and a guide hole 46 at the lower end part thereof. The guide hole 46 is communicated with the threaded hole 45 in alignment with the latter and has an inner diameter which is dimensioned substantially same as an outer diameter of the optical fiber 9. The second jig 49 is formed with a hole 48 which is dimensioned so as to allow only a core 9a of the optical fiber 9 with a sheath 9b removed therefrom to extend through the hole 48.

When the foremost end surface of the optical fiber is to be treated by using the aforementioned jig, first, the fore end of the core 9a is exposed to the outside by a distance of 1 to 2 mm by removing a part of the sheath 9b. Then, while the foregoing state is maintained, the optical fiber 9 extends through the bolt 31 and the elastic seal 32, as shown in FIG. 19. Thereafter, the bolt 31 is threadably fitted into the threaded hole 45 in the first jig 47, whereby the elastic seal 32 is tightly received in a space at the lower end part of the threaded hole 45 and the fore end of the core 9a is protruded outward of the first jig 47 while extending through the guide hole 46. It should be noted that a part of the sheath 9b having the same length as that of the guide hole 46 or a length appreciably longer than that of the guide hole 46 is received in the guide hole 46 of the first jig 47.

Thereafter, while the core 9a is protruded outwardly by a distance of 1 to 2 mm and a part of the sheath 9b is likewise protruded outwardly a little bit, the first jig 47 is brought in pressure contact with the second jig 49.

The hole 48 of the second jig 49 is dimensioned to have an inner diameter larger than an outer diameter of the core 9a but smaller than an outer diameter of the sheath 9b. Thus, when the first jig 47 is firmly mounted on the second jig 49, the sheath 9b is fully received in the guide hole 46. Consequently, the sheath 9b is protected from deformation or damage.

If it is required that the foremost end surface of the core 9a is heated or ground, the second jig 49 is disconnected from the first jig 47 so that the foremost end is ground by using an abrasive paper. It should be added that there is no danger that the sheath 9b swells during a grinding operation, because the outer diameter side of the sheath 9a is firmly retained within the guide hole 46.

On completion of the grinding operation, the bolt 31 is removed from the first jig 47. Thereafter, the bolt 31 is threadably fitted into the threaded hole 16 (see FIG. 11) on the jig 1 shown in FIG. 10. Now, the optical fiber 1 of which foremost end face has been treated is ready to be coupled to the plug 1.

Figure 20:
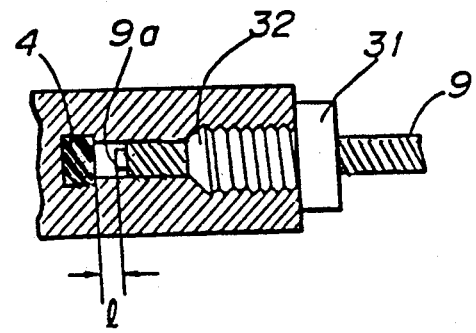
FIG. 20 is a sectional view illustrating an undesirable case where the prior art is applied to an optical connector assembly.

When the first jig 47 is firmly mounted on the second jig 49 as shown in FIG. 18, a distance L between the elastic seal 32 and the foremost end of the core 9a of the optical fiber 9 is approximately set to a length of the guide hole With the conventional technique, since the foremost end surface of an optical fiber is treated without use of a specially designed jig for the foregoing purpose, there arises a problem that the distance L fails to be set uniformly. For example, a gap appears between the foremost end of the optical fiber 9 and the optical element 4, as shown in FIG. 20. This leads to a problem that an optical coupling efficiency is reduced.

The foregoing embodiments have been described above as to a case where the direction of extension of the optical fiber 9 intersect the direction of connection/disconnection of the optical connector assembly at a right angle.

Next, description will be made below with reference to FIGS. 21 to 23 as to a case where the direction of extension of the optical fiber 9 is in parallel with the direction of connection/disconnection of the optical connector assembly.

Figure 21:
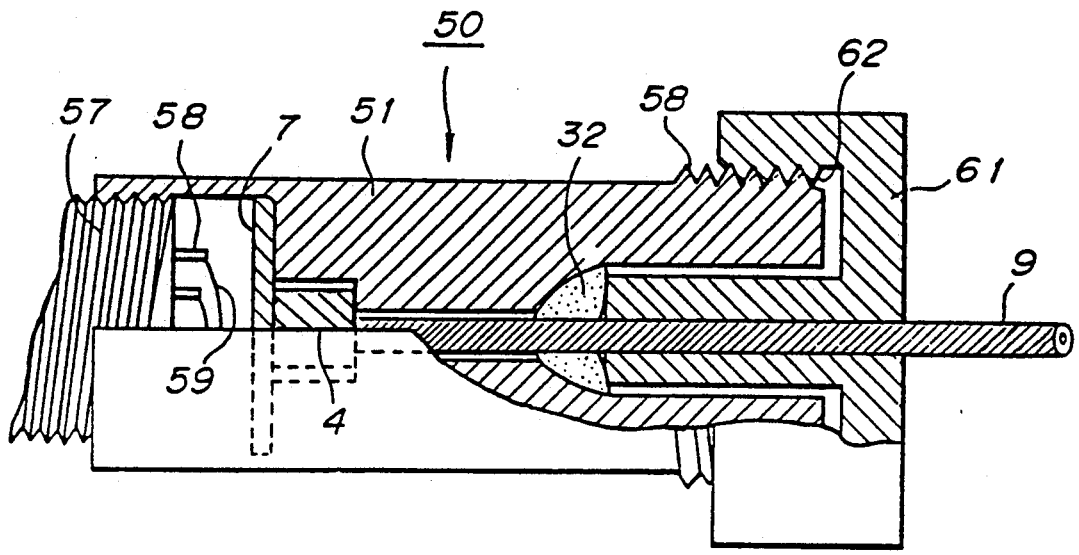
FIG. 21 is a sectional view illustrating an optical connector assembly in accordance with another embodiment of the present invention.
Figure 22:
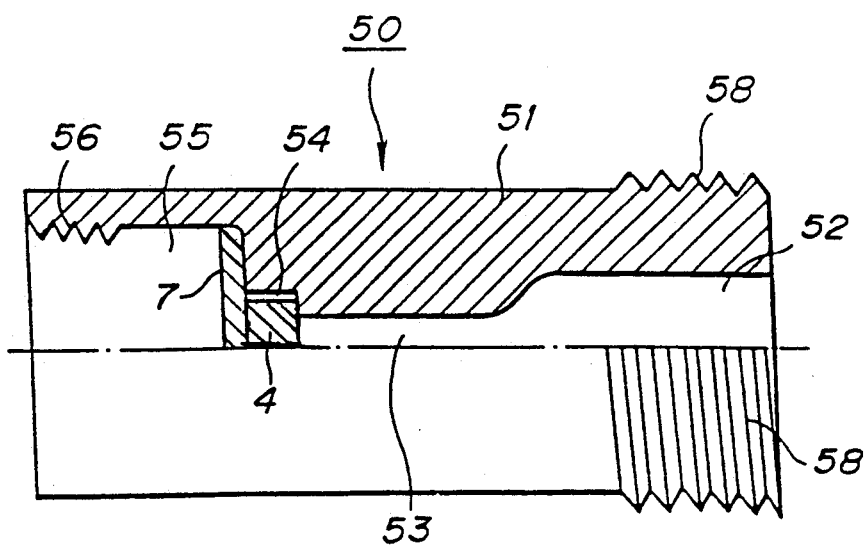
FIG. 22 is a sectional view of an optical module for the optical connector assembly in accordance with the embodiment of the present invention shown in FIG. 21.
Figure 23:
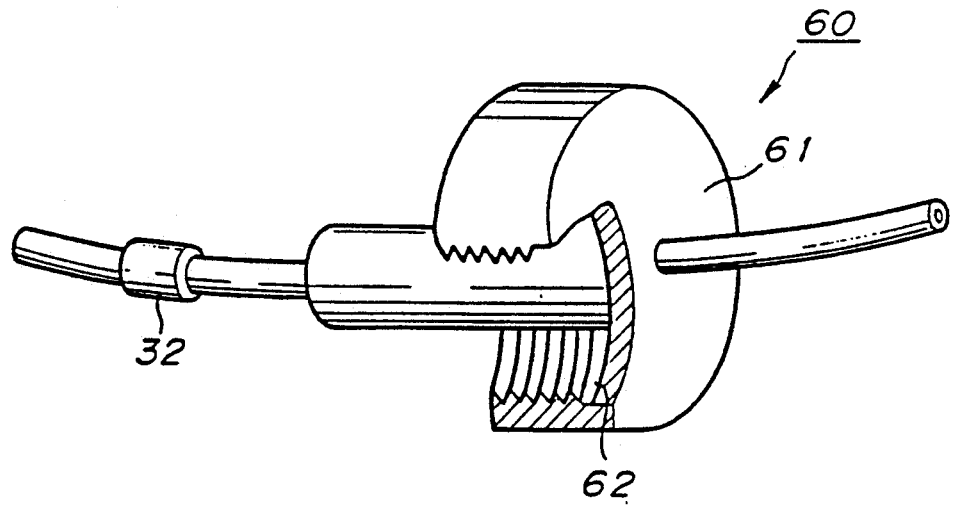
FIG. 23 is a perspective view illustrating an optical fiber fitting unit for the optical connector assembly in accordance with the embodiment of the present invention shown in FIG. 21.

FIG. 21 is a sectional view which illustrates the whole structure of the optical connector assembly after the optical fiber 9 is coupled thereto, FIG. 22 is a sectional view which illustrating structure of an optical module 50 before the optical fiber 9 is coupled to the optical connector assembly, and FIG. 23 is a perspective view which illustrates the optical fiber side before the optical fiber is coupled to the optical connector assembly.

Referring to FIGS. 21 to 23, a guide hole 52 for an optical fiber fitting unit, an optical fiber guide hole 53, an optical element receiving hole 54 and an electrical connector fitting hole 55 are successively formed at the central part of a housing 51 of the optical module 50. A printed-circuit board 7 is firmly placed on the bottom wall of the connector fitting hole 55 and an optical element 4 is immovably mounted on the printed-circuit board 7.

The left-hand end part of the connector fitting hole 55 as seen in the drawings is machined in the form of a threaded hole so that the right-hand male-threaded end part of an electrical module 57 is threadably fitted into the threaded hole of the connector fitting hole 55. Electrical connection of a terminal pin 58 of the electrical module 57 to the printed-circuit board 7 is accomplished by a lead wire 59, as shown in FIG. 21. The electrical module 57 is fitted to a various kind of casing to which the optical connector assembly of the present invention is fitted. In addition, a plurality of male threads 58 are formed on the right-hand end part of the housing 51 of the optical module 50.

As shown in FIG. 23, an optical fiber fitting unit for the optical fiber 9 comprises a cover 61 and an elastic seal 32, and the optical fiber 9 extends through a hole in the cover 61 and a hole in the elastic seal 32. The cover 61 is formed With a plurality of female threads 62. When the optical fiber 9 is coupled to the housing 51 side, the female threads 62 in the cover 61 are threadably engaged with a plurality of male threads 58' on the housing 51 of the optical module 50. Once the cover 61 is threadably fitted to the housing 51 of the optical module 50, the foremost end of the optical fiber 9 is brought in close contact with a light emitting/light receiving surface of the optical element 4, while an elastic seal 32 is tightly encased in the deepest part of the guide hole 52, as shown in FIG. 21.

Figure 24:
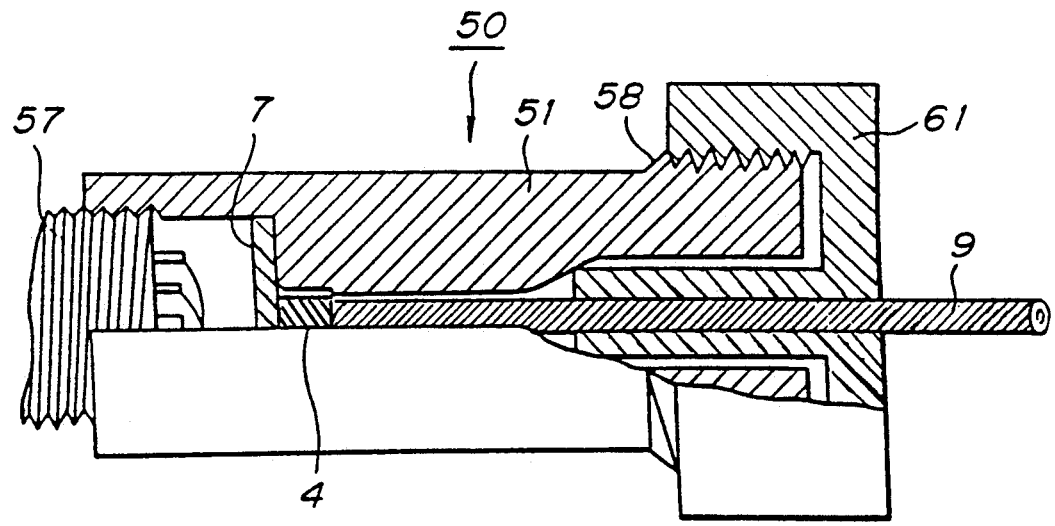
FIG. 24 is a sectional view illustrating an optical connector assembly in accordance with further another embodiment of the present invention.

FIG. 24 is a sectional view which illustrates an optical connector assembly in accordance with an embodiment of the present invention modified from the embodiment which has been described above with reference to FIG. 21. In this modified embodiment, the cover 61 is fully made of elastomeric material, e.g., hard rubber or the like material. Therefore, the elastic seal 32 in the preceding embodiment of the present invention is not required. According to the modified embodiment of the present invention, since the foremost end of the cover 61 made of elastomeric material is brought in pressure contact the inside wall of the housing of the optical module 50, the optical fiber 9 can firmly be held by the cover 61. It should of course be understood that the cover 61 need not be constituted by elastomeric material but only the foremost end of the cover 61 adapted to come in pressure contact with the inside wall of the housing 51 may be made of elastomeric material.

Figure 25:
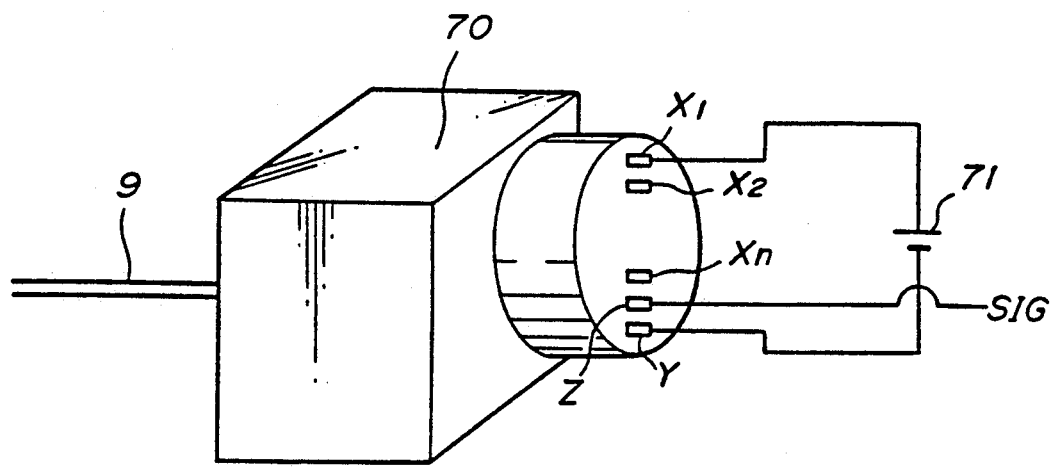
FIG. 25 is a schematic perspective view illustrating an optical signal sending module of the optical connector assembly in accordance with the present invention.

FIG. 25 is a perspective view which schematically illustrates an optical connector assembly of the present invention which is used as an optical signal sending module. The optical signal sending module 70 having the optical fiber 9 coupled thereto includes a minus terminal Y leading to a direct current power supply source 71, a plurality of plus terminals $X_1$ to $X_n$ leading to the power supply source 71 and a terminal SIG to which data are fed, whereby the power supply source 71 can selectively be connected to the minus terminal Y and one of the plural plus terminals $X_1$ to $X_n$.

Figure 26:
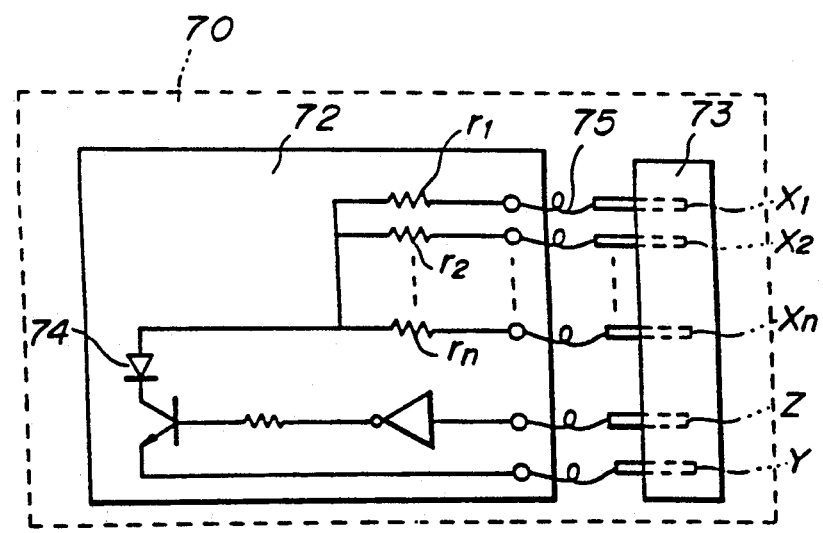
FIG. 26 is a circuit diagram employable for the optical signal sending module in FIG. 25.

FIG. 26 is a wiring diagram which illustrates by way of example a structure of circuits in the optical signal sending module 70. Specifically, the optical signal sending module 70 comprises a light emitting diode driving circuit board (hereinafter referred to as LED driving circuit board) 72 and a connector 73. The LED driving circuit board 72 includes a LED 74 and a plurality of fixed resistors $r_1$ to $r_n$ connected to the LED 74 in parallel with the latter to properly adjust an intensity of optical power. On the other hand, the connector 3 includes a plurality of plus terminals $X_1$ to $X_n$ leading to a power supply source (not shown), a terminal Z to which data are fed and a minus terminal Y leading to the power supply source in the same manner as described above with reference to FIG. 25. The plus terminals $X_1$ to $X_n$ are connected directly to the fixed resistors rl to rn in the LED driving circuit board 72 via a plurality of conductors or a plurality of art work wirings 75 on the LED driving circuit board 72 in an one-to-one relationship.

When the optical signal sending module 70 is connected to a power supply source (not shown) in field, it is required that a corresponding table representing, e.g, a relationship between a length of the optical fiber (i.e. a distance of signal transmission) and the plural terminals $X_1$ to $X_n$ is previously produced. Thus, an operator can select an optimum intensity of light emitting power for the LED 74 merely by connecting a suitable terminal (one of the terminals $X_1$ to $X_n$) in the optical sending module 70 to the power supply source with reference to the corresponding table. Consequently, he can easily perform an adjusting operation in field.

Figure 27:
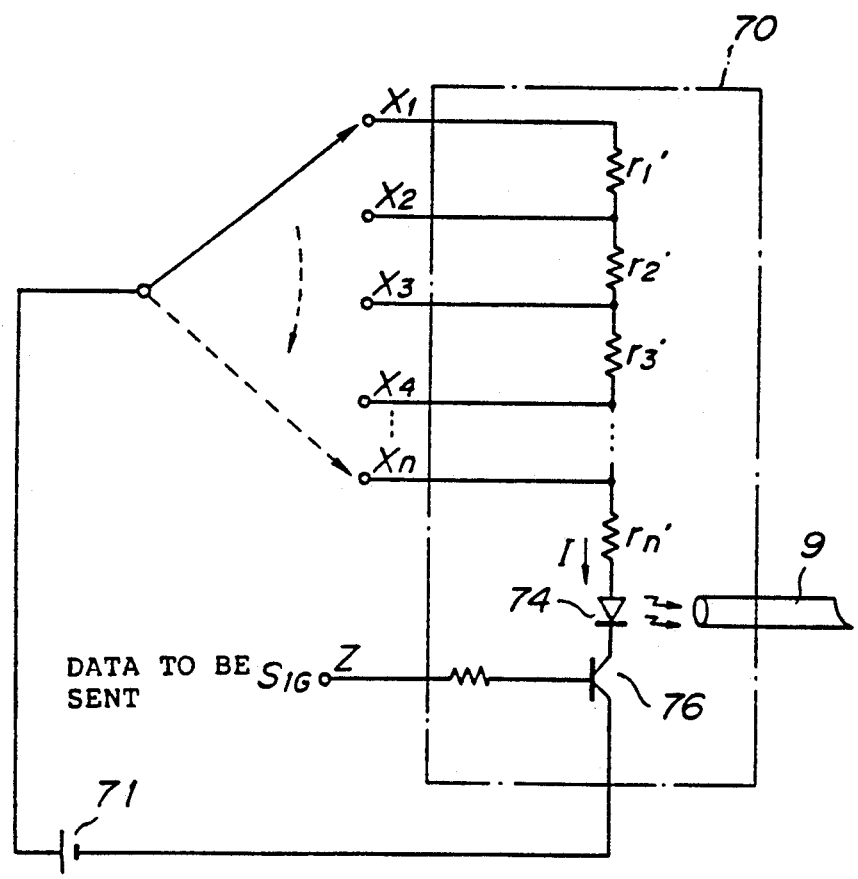
FIG. 27 is a circuit diagram employable for the optical signal sending module in accordance with a modified embodiment of the present invention.

FIG. 27 is a wiring diagram for the optical signal sending module 70 in accordance with an embodiment of the present invention modified from the embodiment which has been described above with reference to FIG. 26. In this modified embodiment, a plurality of fixed resistors $r_1'$ to $r_n'$ are connected to each other in series so as to adjust an intensity of light emitting power.

With the optical signal sending module 70 as constructed in the above-described manner, a value of resistance of each of the plural resistors $r_1'$, $r_2'$, --- $r_n'$ is determined as follows.

Namely, when a composite resistor for each of the plural resistors $r_1'$, $r_2'$, --- $r_n'$ required in correspondence to variation of a distance of signal transmission (i.e., a length of the optical fiber) is represented by $R_1$, $R_2$, --- $R_n$, a value of resistance of each of the resistors $r_1'$, $r_2'$, --- $r_n'$ is preset such that the following equations are established for the respective composite resistor $R_1$, $R_2$, --- $R_n$.

$$R_1 = \sum_{i=1}^{n} r_i'$$

$$R_2 = \sum_{i=2}^{n} r_i'$$

.
.
.

$$R_n = r_n'$$

In other words, when a value of resistance of the plural resistors connected in parallel with each other as shown in FIG. 26 is represented by $r_1$, $r_2$, --- $r_n$, a value of resistance of each of the resistors $r_1'$, $r_2'$--- $r_n'$ is set such that equations of $r_1=R_1$, $r_2=R_2$, --- $r_n=R_n$ are established.

With such construction derived from the serial connection, even in a case where the power supply source 71 is incorrectly connected to two or more terminals among the plural terminals $X_1$ to $X_n$, it is assured that no electric current is fed to the LED 74 with a rating in excess of the maximum rated value.

For example, in a case where the power supply source 71 having a voltage V is incorrectly connected to the plus terminals $X_1$ and $X_2$, an electric current I to be fed to the LED 74 is represented by the following equations.

$$I = V / \sum_{i=2}^{n} r_i'$$

This case is substantially equivalent to a case where the power supply source is connected only to the plus terminal $X_2$.

Similarly, also in a case where the power supply source 71 is incorrectly connected to three or more plus terminals, the remaining resistors ranging from the resistor located nearest to the LED 74 among the plural resistors $r_1'$ to $r_n'$ till the LED 74 have a significant effect on the electric current I but other resistors have no effect on the electric current I.

Therefore, if $R_n$ is set such that an equation of $I=V/R_n$ satisfies a condition of the maximum rated electric current, there is no danger that the LED 74 is undesirably damaged or injured by an excessively high intensity of electric current irrespective of how far incorrect connection is made.

Figure 28:
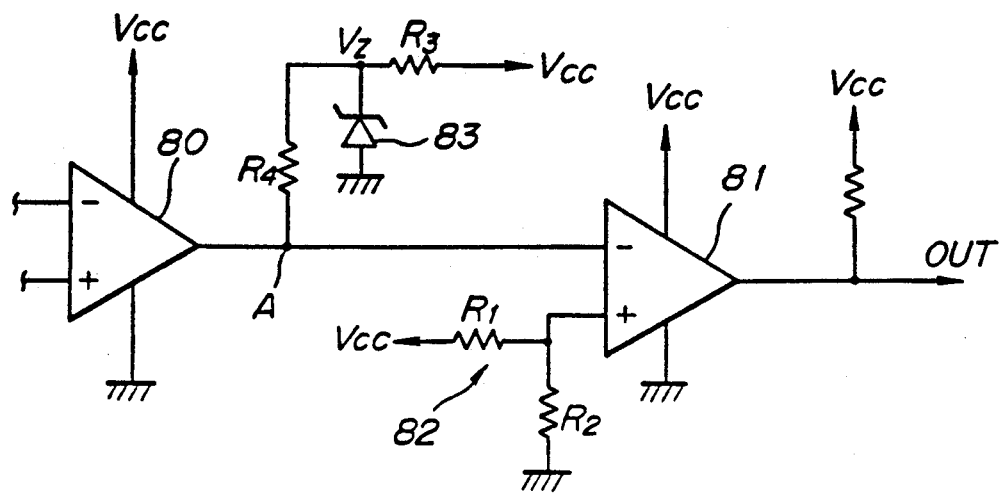
FIG. 28 is a circuit diagram illustrating by way of example a circuit employable for a comparator required for using the optical connector assembly of the present invention.

FIG. 28 is a wiring diagram which illustrates an optical signal receiving circuit for discriminating the logical level of an optical signal received via the optical fiber, after the received optical signal is converted into an electrical signal. A signal derived from integration of received optical signals is inputted into a first comparator 80. In this case, illustration of a structure of an integration circuit for adding the signal derived from integration to an inverted input terminal (minus terminal) of the first comparator 80 as well as a positive feedback circuit for adding an output from the first comparator 80 to a non-inverted input terminal (plus terminal) is eliminated for the purpose of simplification.

In FIG. 28, reference numeral 80 designates a first comparator in which a signal derived from integration of received optical signals is inputted into the inverted input terminal (minus terminal) and a positive feedback signal derived from the positive feedback circuit is inputted into the non-inverted input terminal (plus terminal) so that a signal level of the former signal is compared with a signal level of the latter signal, reference numeral 82 designates a voltage dividing circuit for dividing a voltage $V_{cc}$ of the power supply source by resistors $R_1$ and $R_2$ and reference numeral 81 designates a second comparator in which an output derived from comparison made in the first comparator 80 is inputted into the inverted input terminal and a voltage divided by the voltage dividing circuit 82 is inputted into the non-inverted terminal. A signal representative of an output derived from comparison made in the second comparator 81 is fed to a data processing circuit which is not shown in the drawing. The first and second comparators 80 and 81 are source.

With the circuits shown in FIG. 28, the voltage $V_{cc}$ to be applied to an output terminal of the first comparator 80 is restricted by a Zener diode 83 within a predetermined voltage range so that the second comparator 81 is operated normally.

To assure that the second comparator 81 is operated normally, it is required that a voltage value of the signal to be inputted into the inverted input terminal is reduced lower than a predetermined voltage value (i.e., the upper limit value of a voltage for normally operating the second comparator 81). This upper limit value $V_{in}$ is definitely determined by the voltage value $V_{cc}$ of the power supply source and varies depending on characteristics of the second comparator 81. In general, the upper limit value $V_{in}$ is approximately set to 80% of the voltage value $V_{cc}$.

Therefore, it is required that the maximum voltage value appearing at an output terminal A of the first comparator 80 is set lower than the upper limit value $V_{in}$ for normally operating the second comparator 81.

To meet the requirement with the above-described construction, the voltage $V_{cc}$ of the power supply source (collector voltage) is fed to the output terminal A via resistors $R_3$ and $R_4$. In addition, the Zener diode 83 is connected to the intermediate location between the both resistors $R_3$ and $R_4$ (so that an inverse voltage is applied to the Zener diode 83).

In this case, a Zener voltage $V_z$ of the Zener diode 83 is previously selected such that the following inequality is established.

$$VZ \leq V in < Vcc \qquad (1)$$

In a case where the maximum voltage value appears at the output terminal A, i.e., in a case where an output derived from comparison made in the first comparator 80 reaches a logic "1" level, the voltage value at the output terminal A becomes a Zener voltage value $V_z$ for the Zener diode 83.

Thus, it is assured that the second comparator 81 is normally operated, even when the above inequality (1) is established and the voltage value $V_z$ is inputted into the inverted input terminal of the second comparator 81.

Figure 29:
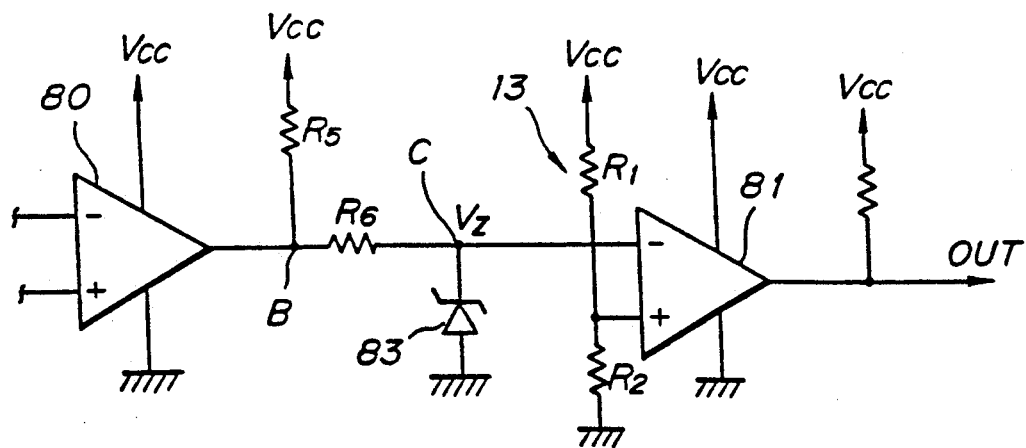
FIGS. 29 to 32 are a circuit diagram illustrating a circuit employable for a comparator in accordance with a modified embodiment of the present invention, respectively.

Alternatively, a circuit structure as shown in FIG. 29 wherein a Zener diode 83 is likewise used may be substituted for the circuit in FIG. 28 with the same advantageous effects.

Specifically, with the structure shown in FIG. 29, the voltage $V_{cc}$ of the power supply source is connected to an output terminal B of the first comparator 80 via a resistor $R_5$ and the Zener diode 83 is connected to an input terminal C of the second comparator 81 (so that an inverse voltage is applied to the input terminal C of the second comparator 81). In addition, a resistor $R_6$ is connected to the intermediate location between the both terminals B and C.

Also in this case, the maximum value of a voltage appearing at the output terminal B becomes equal to a Zener voltage $V_z$ of the Zener diode 83, whereby the inequality (1) is established. Consequently, it is assured that the second comparator 81 is normally operated.

It should be noted that the present invention may be carried out with the resistor $R_6$ in FIG. 29 removed from the circuit system.

Next, description will be made below as to another modified embodiment of the present invention wherein a circuit structure is embodied with the same advantageous effects as those derived from the embodiments as in FIGS. 28 and 29 in such a manner that merely a plurality of resistors are used but no Zener diode is used.

Figure 30:
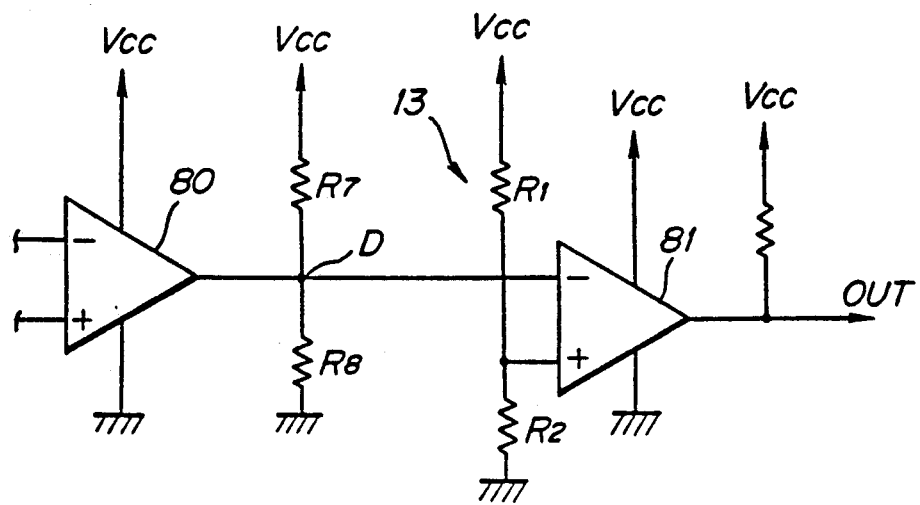

In detail, as shown in FIG. 30, according to the modified embodiment of the present invention, a voltage $V_{cc}$ of the power supply source (collector voltage) is fed to an output terminal D of the first comparator 80 via a resistor $R_7$. One end of a resistor $R_8$ is connected to the output terminal D and the other end of the resistor $R_8$ is earthed, whereby a voltage dividing circuit for dividing the voltage $V_{cc}$ of the power supply source is constructed by using the resistors $R_7$ and $R_8$.

In this case, to assure that the second comparator 81 is normally operated, it is required that the maximum voltage value at the output terminal D, i.e., the divided voltage $V_{out}$ is reduced lower than the upper limit value $V_{in}$ of a voltage for normally operating the second comparator 81 (refer to the following inequality (2)).

$$V_{OUT} \leq V in < Vcc \qquad (2)$$

As will be apparent from the drawing, the divided voltage $V_{out}$ can be represented by the following equation.

$$V_{OUT} = \{R_8/R_7 + R_8)\} \cdot Vcc \qquad (3)$$

Thus, the second comparator 81 can normally be operated by properly selecting the resistors $R_7$ and $R_8$ so as to satisfy the inequality (2) and the equation (3).

Figure 31:
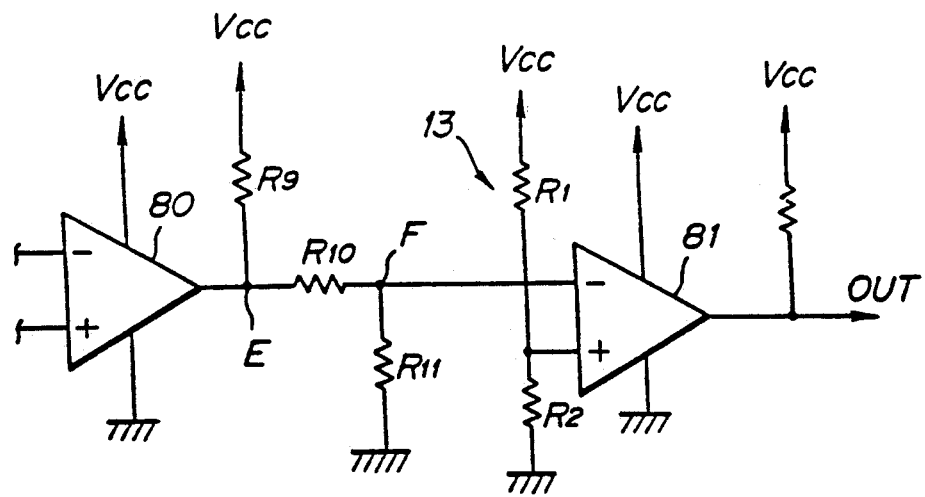

Additionally, the present invention may be embodied as shown in FIG. 31. According to the embodiment of the present invention in FIG. 31, a voltage $V_{cc}$ of the power supply source is fed to an output terminal E of the first comparator 80 via a resistor $R_9$, and one end of a resistor $R_{11}$ is connected to an input terminal F of the second comparator 81, while the other end of the resistor $R_{11}$ is earthed. In addition, a resistor $R_{10}$ is connected to the intermediate location between the both terminals E and F. In a case where the voltage $V_{cc}$ of the power supply source is divided by using the resistors $R_9$, $R_{10}$ and $R_{11}$, the divided voltage value at the input terminal F is represented by the following equation.

$$V_{OUT} = \{R_{11}/(R_9 + R_{10} + R_{11})\} \cdot V_{cc} \quad (4)$$

Thus, normal operation of the second comparator 81 can be achieved by properly selecting the resistors $R_9$, $R_{10}$ and $R_{11}$ so as to satisfy the above equation.

According to the aforementioned embodiments of the present invention, a voltage divided so as to allow the voltage $V_{cc}$ of the power supply source to be reduced lower than the voltage $V_{in}$ for normally operating the second comparator 81 by using a Zener diode or a plurality of resistors is applied to the output terminal of the first comparator 80, whereby a voltage to be inputted into the input terminal of the second comparator 81 is properly adjusted within the correct operative range. Alternatively, the present invention may be embodied with the same advantageous effects as those derived from the foregoing embodiments by boosting the voltage $V_{cc}$ of the power supply source to be fed to the second comparator 81 thereby to raise up the upper limit voltage of the correct operative range.

Figure 32:
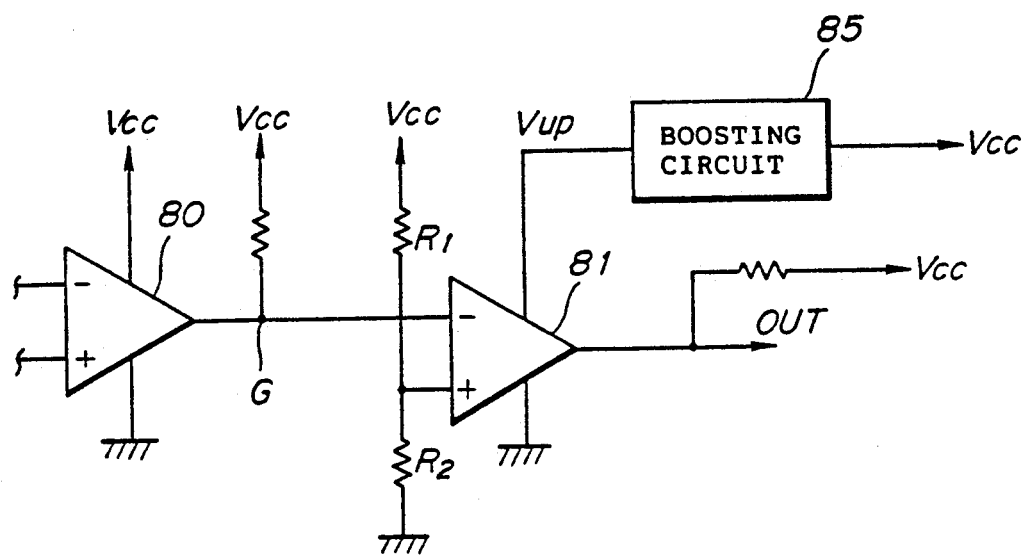

Specifically, as shown in FIG. 32, a boosting circuit 85 (of the type e.g., including an AC/DC converter as an essential component) is arranged between the second comparator 81 and the voltage $V_{cc}$ of the power supply source so that the voltage $V_{cc}$ of the power supply source is boosted to a predetermined value of voltage $V_{up}$ by the boosting circuit 85. Then, the thus boosted voltage, $V_{up}$ is fed to the second comparator 81.

The upper limit value $V_{in}$ of voltage for normally operating the second comparator 81 is definitely determined by the boosted voltage $V_{up}$.

When the maximum value of a voltage appearing at an output terminal G of the first comparator 80 is represented by $V_{cc}$ (held at a logical "1" level) as shown in the drawing, a condition for normally operating the second comparator 81 is expressed by the following inequality.

$$Vcc \leq Vin' \quad (5)$$

Thus, the second comparator 81 can normally be operated by boosting the voltage $V_{cc}$ of the power supply source to a boosted voltage $V_{up}$ so as to establish the above inequality (5).

With the conventional circuit structure shown in FIG. 8, there arises a problem that a normal output wave form can not be obtained in the first comparator 81, as shown in FIGS. 9(a) and (b). In contrast with the conventional circuit structure, according to the embodiment of the present invention, an essentially ideal wave form as shown in FIG. 9(c) can be obtained by employing the circuit structure as described above.

INDUSTRIAL APPLICABILITY

The optical connector assembly of the present invention is advantageously employable for the purpose of making optical communication under a normal control for various kinds of industrial apparatuses or equipments to be operated in a severe environment including vibration, noisy sound, contaminated material, moisture or dust, e.g., facilities in a factory or industrial machinery.

We claim:

1. An optical connector assembly for connecting optical fibers, comprising:
    a switching circuit which is switched to an on or off status responsive to data sent to said circuit;
    a light-emitting diode connected with said switching circuit, said light-emitting diode being turned on or off in response to the status of the switching circuit;
    an optical fiber means comprising a plurality of optical fibers for transmitting light emitted from the light-emitting diode, each of said optical fibers having a different length;
    resistor means including a plurality of fixed resistors having different resistance values corresponding to said different lengths of optical fibers, one end of said resistor means connected in parallel with one terminal of the light-emitting diode;
    a plurality of first power supply terminals, each of said terminals connected in series with each of the other ends of the plurality of fixed resistors, each of said first power supply terminals having the same polarity;
    a data supply terminal connected to the switching circuit for supplying transmission data;
    a second power supply terminal connected to the switching circuit, said second power supply terminal having a polarity different from that of said first power supply terminals; and
    power source means connected to one of the plurality of first power supply terminals and to the second power supply terminal for supplying power to the light-emitting diode,
    wherein the switching circuit, the light-emitting diode and the resistor means are built in a single module having said first power supply terminals, said second power supply terminal and said data supply terminal.

2. An optical connector assembly for connecting optical fibers, comprising:
    a switching circuit which is switched to an on or off status responsive to data sent to said circuit;
    a light-emitting diode connected with said switching circuit, said light-emitting diode being turned on or off in response to said status of the switching circuit;
    optical fiber means for transmitting light emitted from the light-emitting diode, said optical fiber means comprising a plurality of optical fibers, each of said optical fibers being of different lengths;
    resistor means including a plurality of fixed resistors being connected in series so as to have a plurality of different series composite resistance values, corresponding of said different lengths of said optical fibers, said fixed resistors being connected in series with said light-emitting diode;

a plurality of first power supply terminals, each of said first power supply terminals connected to each of said series-connected fixed resistors and having the same polarity;

a data supply terminal connected to the switching circuit for supplying transmission data;

a second power supply terminal connected of the switching circuit and having a polarity different from said first power supply terminals; and power source means connected to one of said plurality of first power supply terminals and the second power supply terminal, for supplying power to the light-emitting diode, wherein the switching circuit, the light-emitting diode and the resistor means are built in a signal module having said first power supply terminals, said second power supply terminal and said data supply terminal.

* * * * *